United States Patent
Nellen et al.

(10) Patent No.: US 10,625,585 B2
(45) Date of Patent: Apr. 21, 2020

(54) OPEN ROOF CONSTRUCTION FOR A VEHICLE

(71) Applicant: INALFA ROOF SYSTEMS GROUP B.V., Venray-Oostrum (NL)

(72) Inventors: Marcel Johan Christiaan Nellen, Merselo (NL); Rainer Gerhard Jungling, Dusseldorf (DE)

(73) Assignee: Inalfa Roof Systems Group B.V., Venray-Oostrum (NL)

( * ) Notice: Subject to any disclaimer, the term of this patent is extended or adjusted under 35 U.S.C. 154(b) by 0 days.

(21) Appl. No.: 16/037,688

(22) Filed: Jul. 17, 2018

(65) Prior Publication Data
US 2019/0031002 A1 Jan. 31, 2019

(30) Foreign Application Priority Data
Jul. 25, 2017 (EP) .................................... 17182934

(51) Int. Cl.
| | |
|---|---|
| *B60J 7/047* | (2006.01) |
| *B60J 7/185* | (2006.01) |
| *B60J 7/043* | (2006.01) |
| *B60J 7/19* | (2006.01) |
| *B60J 7/02* | (2006.01) |
| *B60J 7/057* | (2006.01) |

(52) U.S. Cl.
CPC ............. *B60J 7/0435* (2013.01); *B60J 7/024* (2013.01); *B60J 7/057* (2013.01); *B60J 7/192* (2013.01)

(58) Field of Classification Search
CPC . B60J 7/047; B60J 7/0435; B60J 7/053; B60J 7/057; B60J 7/0573; B60J 7/04; B60J 7/024; B60J 7/192

USPC .................. 296/216.02–216.05, 220.01, 223
See application file for complete search history.

(56) References Cited

U.S. PATENT DOCUMENTS

| | | | |
|---|---|---|---|
| 8,182,029 B2 * | 5/2012 | Van Boxtel | ............ B60J 7/0435 296/216.03 |
| 9,975,411 B2 | 5/2018 | Kanai | |
| 2017/0305243 A1 | 10/2017 | Kanai | |

FOREIGN PATENT DOCUMENTS

| | | |
|---|---|---|
| DE | 3536184 C1 | 11/1986 |
| DE | 202010012974 U1 | 2/2017 |
| EP | 3124300 A1 | 2/2017 |

OTHER PUBLICATIONS

European Search Report dated Jan. 29, 2016, for corresponding European Patent Application No. 17182934.4, filed Jul. 25, 2017.

* cited by examiner

*Primary Examiner* — Dennis H Pedder
(74) *Attorney, Agent, or Firm* — Steven M. Koehler; Westman, Champlin & Koehler, P.A

(57) ABSTRACT

A vehicle roof construction comprises a roof opening, a panel and an operating mechanism. The operating mechanism comprises a rear assembly having a lever. The lever rotates around a first transverse axis at its first end. The first transverse axis position changes along a first guide. The second end of the lever at a second transverse axis is pivotally attached to a sliding member that engages a panel track. The rear assembly comprises an auxiliary lever that rotates around a third transverse axis at its first end. The position of the third transverse axis changes along a second guide. The second end of the auxiliary lever at a fourth transverse axis is pivotally attached to the sliding member. The auxiliary lever comprises a support which in the open (Continued)

position of the panel engages a counter support for transmitting vertical forces from the panel towards the counter support.

20 Claims, 3 Drawing Sheets

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening in a stationary roof part, a panel which by an operating mechanism is movable between a closed position in which it closes the roof opening and an open position in which the panel is moved rearwards to a position at least partially above a part of the stationary roof part behind the roof opening, wherein the operating mechanism comprises a rear moving assembly for guiding and supporting the panel, which rear moving assembly is provided with a lever for guiding and supporting the panel, which lever has a first end and a second end, wherein the lever can rotate around a first transverse axis at its first end, wherein the position of the first transverse axis can change by a movement substantially in a longitudinal direction of the vehicle along a first guide and wherein the second end of the lever at a second transverse axis is pivotally attached to a sliding member which in a sliding manner engages a track which is part of the panel.

It is noted that within the context of the present disclosure the "stationary roof part" also may be an adjacent part of the roof which can move independently, such as an adjacent panel with its own operating mechanism.

In a known open roof construction of such a type the panel generally is moved and guided by the rear moving assembly which cooperates with a rear part of the panel and by a forward mechanism (such as for example a combination of stationary curved track cooperating with a guide shoe fixed to a forward part of the panel) which both define elements of the operating mechanism (which, in addition, may comprise further elements, such as for example a drive member or slide which is responsible for activating the elements of the operating mechanism).

In known open roof constructions of such a type the opening dimension of the panel (the amount of the roof opening which will be freed in the open position of the panel) is limited by the minimum stability required for the panel in the open position. A major factor determining said stability is the stability of the rear moving assembly, and especially the stability at the sliding member. Such a stability mainly is determined by the stability of the lever.

One possible solution for providing sufficient stability when increasing the amount in which the panel frees the roof opening, would be to add a second, similarly shaped lever, such that two similar (in most cases mirror imaged) levers engage opposite sides of the sliding member. These two levers indeed can increase the stability, but it is a disadvantage that the additional lever interferes with parts of the open roof construction (such as parts of the operating mechanism).

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction is disclosed wherein the rear moving assembly further comprises an auxiliary lever having a first end and a second end, wherein the auxiliary lever can rotate around a third transverse axis at its first end, wherein the position of the third transverse axis can change by a movement substantially in a longitudinal direction of the vehicle along a second guide, wherein the second end of the auxiliary lever at a fourth transverse axis is pivotally attached to the sliding member and wherein the auxiliary lever comprises a support which in the open position of the panel engages a counter support configured to transmit vertical directed forces from the panel towards the counter support.

The use of such an auxiliary lever allows to change the design such that any interference with other parts of the open roof construction is minimised while achieving the desired amount of stability in the open position of the panel. The auxiliary lever will passively follow the movement of the rear moving assembly (the movement of which generally is caused by an active drive of the lever) while the lever remains responsible for the movement of the panel (as an alternative the auxiliary lever may be driven actively while the lever follows such a movement passively). Thus a change of the design of the auxiliary lever to obtain the desired minimised interference will not change the function carried out by the lever and one is free to change the design of the auxiliary lever as desired. The movement of the auxiliary lever differs from the movement of the lever. In the open position of the panel the auxiliary lever assumes a position in which an additional support in the vertical direction is achieved through the engagement between the support of the auxiliary lever and the counter support (which are part of a different part of the open roof construction). It is conceivable, thus, that the lever and the auxiliary lever move along different paths during the movement of the panel between the open and closed positions.

In one embodiment the fourth transverse axis coincides with the second transverse axis, and as a result the construction is simplified. It is noted that these (mathematical) transverse axes may be defined by different (constructional) shafts which however are concentric.

In one embodiment of the open roof construction the second guide is located at a higher level than the level of the first guide. This creates space below the auxiliary lever for accommodating other parts of the open roof construction.

In an alternative embodiment it is possible that the first guide and the second guide are combined into a single guide. In such an embodiment, however, the transverse axes at the first ends of the lever and of the auxiliary lever generally will be positioned at different locations in such a combined guide.

In one embodiment the lever and the auxiliary lever are positioned at opposite sides of the sliding member. For stability this is favorable because a tilting moment on the sliding member (with a risk on jamming) will be minimised.

It is conceivable that the support of the auxiliary lever comprises a support face extending substantially horizontally and resting on top of the counter support in the open position of the panel. Such a combination of horizontal support face and counter support yields a very effective support in the vertical direction.

It is possible, then, that the support face defines an upper wall of a slot defined in the auxiliary lever, which slot in the open position of the panel extends substantially horizontally and has one open end for receiving therein the counter support when the panel moves from the closed towards the open position.

Preferably the counter support comprises a transverse support pin having a diameter and wherein the slot has a width closely matching the diameter of the support pin. As a result the position of the pin within the slot is very well-defined for further increasing the stability of the panel in its open position. The slot is capable of transferring forces in a vertical direction in two senses (upwards and downwards).

In one embodiment the counter support has a stationary position. The counter support for example may be attached to a stationary part of the open roof construction or vehicle. The process of engaging and disengaging between the support of the auxiliary lever and the counter support then solely is a result of the movement of the auxiliary lever.

As an alternative, however, it is conceivable that the counter support is movable. In such a case the process of engaging and disengaging between the support of the auxiliary lever and the counter support not only is a result of the movement of the auxiliary lever but also of the movement of the counter support.

In one embodiment the counter support is movable to a position for locking the auxiliary lever when the panel is in the open position. In such an embodiment the movement of the counter support is used to achieve a locked position of the auxiliary lever in the open position of the panel such as to prevent an unwanted movement of the auxiliary lever away from its position in which it supports the panel (for example as a result of impacts or vibrations).

Preferably the panel has two opposite, longitudinally extending sides each provided with an operating mechanism comprising a rear moving assembly with lever and auxiliary lever.

In one embodiment the auxiliary lever is positioned inwardly from the lever.

Further it is conceivable that the construction is such that the lever and the auxiliary lever move along different paths during the movement of the panel between the open and closed positions.

BRIEF DESCRIPTION OF THE DRAWINGS

Hereinafter aspects of the invention will be elucidated while referring to the drawings in which.

DETAILED DESCRIPTION OF THE ILLUSTRATIVE EMBODIMENT

Figure 1:
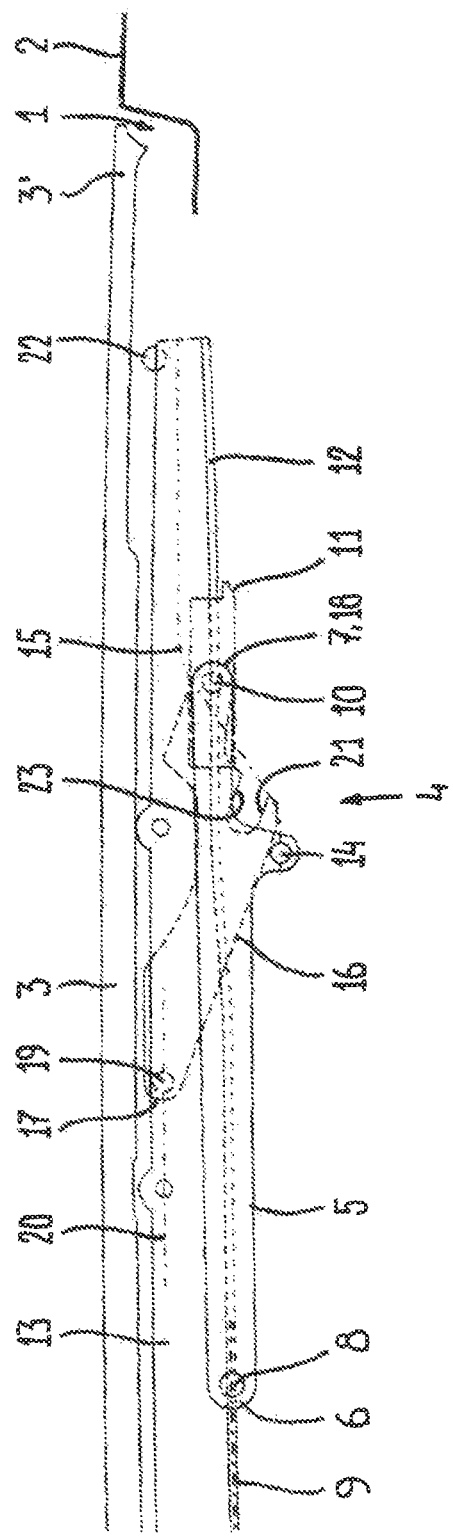
FIG. 1 in a schematical side elevational view illustrates part of an open roof construction in a closed position.

In FIG. 1 part of an embodiment of an open roof construction for a vehicle is illustrated in a schematical manner in a closed position. It comprises a roof opening 1 in a stationary roof part 2, a panel 3 which by an operating mechanism is movable between a closed position (FIG. 1) in which it closes the roof opening 1 and an open position (FIG. 3) in which the panel 3 is moved rearwards to a position at least partially above a part of the stationary roof part 2 behind the roof opening. Apart from components not illustrated here (and not relevant for understanding the present invention), the operating mechanism comprises a rear moving assembly 4 for guiding and supporting the panel 3.

The operating mechanism and its constitutive parts may be provided at both longitudinal sides of the panel 3.

The rear moving assembly 4 is provided with a lever 5 for guiding and supporting the panel 3. This lever 5 has a first end 6 and a second end 7. The lever 5 can rotate around a first transverse axis 8 at its first end 6, wherein the position of the first transverse axis 8 can change by a movement substantially in a longitudinal direction of the vehicle (in the figures horizontally from the left to the right and vice versa) along a first guide 9, for example as driven by a drive slide (not illustrated but known per se). Thus the lever 5 is a positively or actively driven lever.

The second end 7 of the lever at a second transverse axis 10 is pivotally attached to a sliding member 11 which in a sliding manner engages a track 12 which is part of the panel 3 (for example part of a brace 13 connected to the panel 3).

The lever, as known per se, further comprises a roller 14 cooperating with a curved track 15 (which may be stationary or movable), such that when the first end 6 of the lever moves along the first guide 9, the position and orientation of the lever 5 will be determined by the cooperation between the roller 14 and curved track 15.

The rear moving assembly 4 further comprises an auxiliary lever 16 (positioned, preferably, inside of the lever 5 at the opposite side of the sliding member 11) having a first end 17 and a second end 18. The auxiliary lever 16 can rotate around a third transverse axis 19 at its first end 17, wherein the position of the third transverse axis can change by a movement substantially in the longitudinal direction of the vehicle along a second guide 20. The second end 18 of the auxiliary lever 16 is pivotally attached to the sliding member 11 at a fourth transverse axis 10' which, as indicated by the combined reference numbers 10, 10' in FIG. 2, in this embodiment is common with the transverse axis 10 of the lever 5. In alternative embodiments, however, the second end 18 of the auxiliary lever 16 may be pivotally attached to the sliding member 11 at another transverse axis which is not common with the lever 5.

Figure 4:
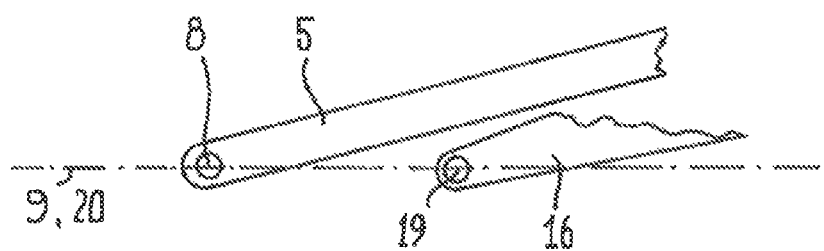
FIG. 4 illustrates a schematical and partial side elevational view of an alternative embodiment of an open roof construction with combined guides.

In the illustrated embodiment the second guide 20 is located at a higher level than the level of the first guide 9. In other embodiments both guides 9 and 20 may be combined into a single guide (as illustrated in the partial illustration of an embodiment in FIG. 4).

The auxiliary lever 16 comprises a slot 21 acting as a support which in the open position of the panel 3 (FIG. 3) engage a pin 22 acting as a counter support for transmitting vertical directed forces from the panel 3 (through the sliding member 11) towards a stationary part of the open roof construction. The diameter of the pin 22 preferably closely matches a width of the slot 21.

The slot 21 comprises an upper wall 23 which will engage the pin 22. The slot in the open position of the panel 3 extends substantially horizontally and has one open end for receiving therein the pin 22 when the panel moves from the closed position towards the open position.

Figure 2:
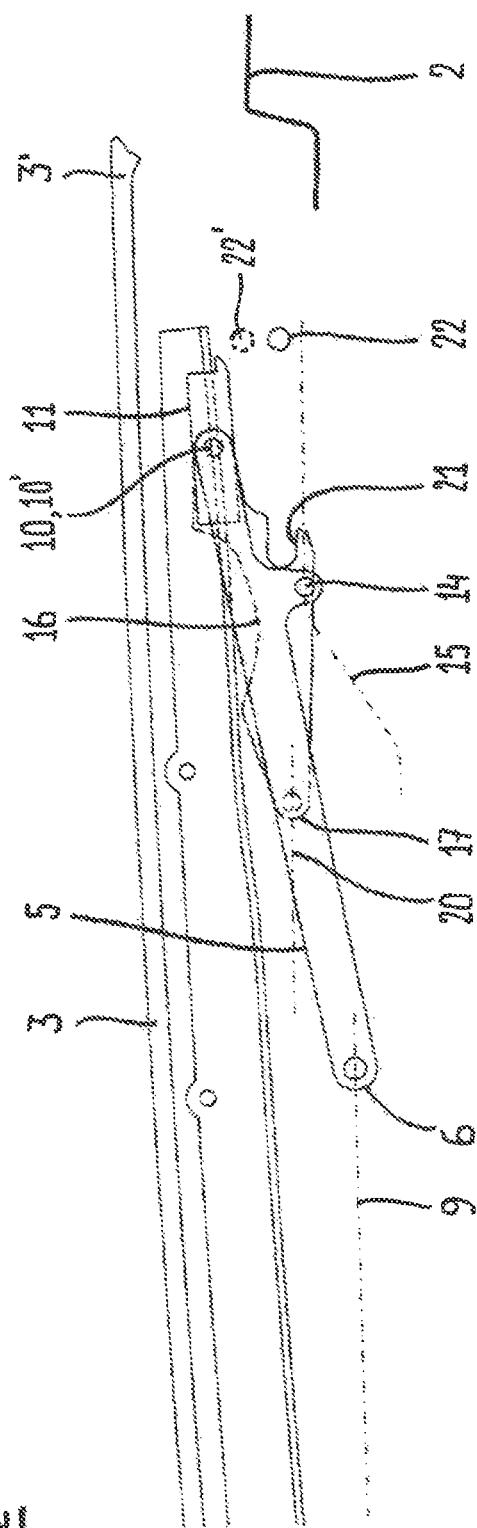
FIG. 2 in a similar schematical side elevational view illustrates said part of the open roof construction in an intermediate position, and FIG. 3 in a similar schematical side elevational view illustrates said part of the open roof construction in an open position.

Whereas the pin 22 in the illustrated embodiment comprises a stationary pin extending transversally, in other embodiments the pin 22 (or other counter support means) also may be movable (for example to a position 22' as illustrated in broken lines in FIG. 2 for locking the auxiliary lever 16 when the panel 3 is in the open position) or may have another orientation or shape.

Starting from the closed position illustrated in FIG. 1 the lever 5 is moved and rotated (for example by pushing/pulling its first end 6 along the first guide 9 by means of a drive slide). The roller 14 follows the curved track 15 and the lever 5, sliding member 11 and thus the auxiliary lever 16 (as caused by the sliding member 11) and panel 3 firstly reach an intermediate position as illustrated in FIG. 2 in which a rear end 3' of the panel (to the right in FIGS. 1-3) is lifted. The lever 5 and auxiliary lever 16 both have been rotated to the illustrated positions (in addition to a respective rearward movement, as a result of which, for example, the first end 17 of the auxiliary lever 16 has moved along the second guide 20).

Figure 3:
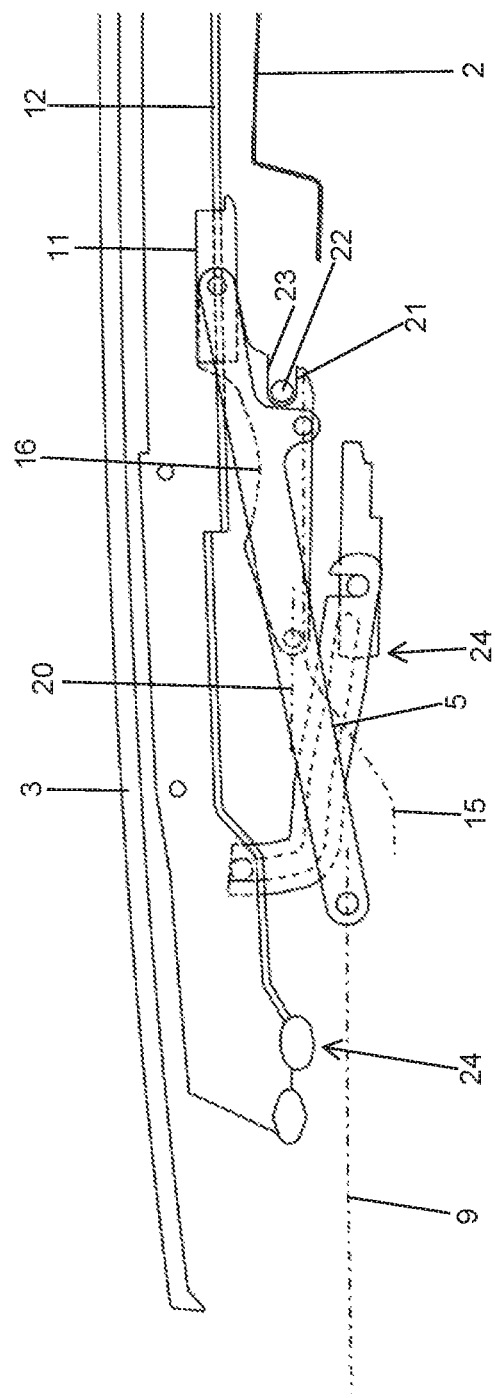

A continued movement (for example also encompassing driving the panel 3 through components of the operating mechanism not illustrated but known per se) causes the panel 3 to slide rearwards with its track 12 along sliding member 11, such that the panel will be positioned partly above the stationary roof part 2. Finally a position in accordance with FIG. 3 is reached in which the lever 5 and auxiliary lever 16 have moved that far that the slot 21 has received the pin 22. Forces acting on the panel 3 now not only are transmitted through the lever 5, but also through the upper wall 23 of the slot 21 of the auxiliary lever 16 towards the pin 22. This increases the stability of the panel 3 in its open position, while below the auxiliary lever 16 room is left for other components, such as parts 24 of a forward moving mechanism that have moved rearwards towards (and alongside) the lever 5 and towards (and below) auxiliary lever 16 (as illustrated in FIG. 3).

The invention is not limited to the embodiments described before which may be varied widely within the scope of the invention as defined by the appending claims.

The invention claimed is:

1. An open roof construction for a vehicle, comprising:
   a stationary roof part having a roof opening;
   a panel having a track;
   a sliding member engaging the track; and
   an operating mechanism configured to move the panel between a closed position in which the panel closes the roof opening and an open position in which the panel is moved rearwards to a position at least partially above a part of the stationary roof part behind the roof opening, wherein the operating mechanism comprises:
      a rear moving assembly configured to guide and support the panel, which rear moving assembly comprises:
         a lever configured to guide and support the panel, which lever has a first end and a second end, wherein the lever rotates around a first transverse axis at its first end, wherein the position of the first transverse axis changes by a movement substantially in a longitudinal direction of the vehicle along a first guide and wherein the second end of the lever at a second transverse axis is pivotally attached to the sliding member; and
         an auxiliary lever having a first end and a second end, wherein the auxiliary lever rotates around a third transverse axis at its first end, wherein the position of the third transverse axis changes by a movement substantially in a longitudinal direction of the vehicle along a second guide, wherein the second end of the auxiliary lever at a fourth transverse axis is pivotally attached to the sliding member and wherein the auxiliary lever comprises a support which in the open position of the panel engages a counter support configured to transmit vertical directed forces from the panel towards the counter support, and wherein the support of the auxiliary lever comprises a support face extending substantially horizontally and resting on top of the counter support in the open position of the panel.

2. The open roof construction according to claim 1, wherein the fourth transverse axis coincides with the second transverse axis.

3. The open roof construction according to claim 1, wherein the second guide is located at a higher level than the level of the first guide.

4. The open roof construction according to claim 1, wherein the first guide and the second guide are combined into a single guide.

5. The open roof construction according to claim 1, wherein the lever and the auxiliary lever are positioned at opposite sides of the sliding member.

6. The open roof construction according to claim 1, wherein in the auxiliary lever a slot is provided having an upper wall which is defined by the support face, which slot in the open position of the panel extends substantially horizontally and has one open end for receiving therein the counter support when the panel moves from the closed position towards the open position.

7. The open roof construction according to claim 6, wherein the counter support comprises a transverse support pin having a diameter and wherein the slot has a width closely matching the diameter of the support pin.

8. The open roof construction according to claim 1, wherein the counter support has a stationary position.

9. The open roof construction according to claim 1, wherein the counter support is movable.

10. The open roof construction according to claim 1, wherein the auxiliary lever is positioned inwardly from the lever.

11. An open roof construction for a vehicle, comprising:
    a stationary roof part having a roof opening;
    a panel having a track;
    a sliding member engaging the track; and
    an operating mechanism configured to move the panel between a closed position in which the panel closes the roof opening and an open position in which the panel is moved rearwards to a position at least partially above a part of the stationary roof part behind the roof opening, wherein the operating mechanism comprises:
       a rear moving assembly configured to guide and support the panel, which rear moving assembly comprises:
          a lever configured to guide and support the panel, which lever has a first end and a second end, wherein the lever rotates around a first transverse axis at its first end, wherein the position of the first transverse axis changes by a movement substantially in a longitudinal direction of the vehicle along a first guide and wherein the second end of the lever at a second transverse axis is pivotally attached to the sliding member; and
          an auxiliary lever having a first end and a second end, wherein the auxiliary lever rotates around a third transverse axis at its first end, wherein the position of the third transverse axis changes by a movement substantially in a longitudinal direction of the vehicle along a second guide, wherein the second end of the auxiliary lever at a fourth transverse axis is pivotally attached to the sliding member, the fourth transverse axis coinciding with the second transverse axis, and wherein the auxiliary lever comprises a support which in the open position of the panel engages a counter support configured to transmit vertical directed forces from the panel towards the counter support.

12. The open roof construction according to claim 1, wherein the support and counter support comprise a pin and slot connection.

13. The open roof construction according to claim 12, wherein the counter support is the pin and the support comprises a support face of the slot, the support face extending substantially horizontally and resting on top of the pin in the open position of the panel.

14. The open roof construction according to claim 12, wherein the slot comprises an open end to receive the pin.

15. The open roof construction according to claim 14, wherein the slot is located on the auxiliary lever and the support comprises a surface of the slot, and wherein the pin is the counter support.

16. The open roof construction according to claim 15, wherein pin has a stationary position.

17. An open roof construction for a vehicle, comprising:
a stationary roof part having a roof opening;
a panel having a track;
a sliding member engaging the track; and
an operating mechanism configured to move the panel between a closed position in which the panel closes the roof opening and an open position in which the panel is moved rearwards to a position at least partially above a part of the stationary roof part behind the roof opening, wherein the operating mechanism comprises:
  a rear moving assembly configured to guide and support the panel, which rear moving assembly comprises:
    a lever configured to guide and support the panel, which lever has a first end and a second end, wherein the lever rotates around a first transverse axis at its first end, wherein the position of the first transverse axis changes by a movement substantially in a longitudinal direction of the vehicle along a first guide and wherein the second end of the lever at a second transverse axis is pivotally attached to the sliding member; and
    an auxiliary lever having a first end and a second end, wherein the auxiliary lever rotates around a third transverse axis at its first end, wherein the position of the third transverse axis changes by a movement substantially in a longitudinal direction of the vehicle along a second guide, the second guide being located at a higher level than the level of the first guide, wherein the second end of the auxiliary lever at a fourth transverse axis is pivotally attached to the sliding member and wherein the auxiliary lever comprises a support which in the open position of the panel engages a counter support configured to transmit vertical directed forces from the panel towards the counter support.

18. The open roof construction according to claim 17, wherein the support slidably engages the counter support.

19. The open roof construction according to claim 18, wherein the support includes a support face resting on top of the counter support in the open position of the panel.

20. The open roof construction according to claim 19, wherein the support and counter support comprise a pin and slot connection.

\* \* \* \* \*